United States Patent
Ogawa et al.

(10) Patent No.: US 10,201,960 B2
(45) Date of Patent: Feb. 12, 2019

(54) LAMINATION DEVICE

(71) Applicant: TOYOTA JIDOSHA KABUSHIKI KAISHA, Toyota-shi, Aichi-ken (JP)

(72) Inventors: Takashi Ogawa, Toyota (JP); Tomoyuki Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 619 days.

(21) Appl. No.: 14/921,597

(22) Filed: Oct. 23, 2015

(65) Prior Publication Data

US 2016/0136936 A1    May 19, 2016

(30) Foreign Application Priority Data

Nov. 13, 2014   (JP) .................................. 2014-230404

(51) Int. Cl.
| | |
|---|---|
| *B32B 37/10* | (2006.01) |
| *B32B 37/06* | (2006.01) |
| *B32B 37/00* | (2006.01) |

(52) U.S. Cl.
CPC .......... *B32B 37/10* (2013.01); *B32B 37/0053* (2013.01); *B32B 37/06* (2013.01); *B32B 2309/14* (2013.01); *B32B 2457/00* (2013.01)

(58) Field of Classification Search
CPC .. B32B 37/0053; B32B 37/10; B32B 2309/14
USPC ....................................................... 156/555
See application file for complete search history.

(56) References Cited

U.S. PATENT DOCUMENTS

| | | | |
|---|---|---|---|
| 6,715,978 B2 * | 4/2004 | Lin ................... | H01L 21/67259 198/867.11 |
| 2005/0109457 A1 * | 5/2005 | Amimoto ............ | B29C 63/0047 156/308.2 |

FOREIGN PATENT DOCUMENTS

| | | |
|---|---|---|
| DE | 198 38 581 A1 | 3/2000 |
| JP | S59-87161 U | 6/1984 |
| JP | S63-37925 A | 2/1988 |
| JP | H11-266080 A | 9/1999 |

* cited by examiner

*Primary Examiner* — Philip C Tucker
*Assistant Examiner* — John Blades
(74) *Attorney, Agent, or Firm* — Oliff PLC

(57) ABSTRACT

A lamination device that laminates a laminate material on a front surface of a substrate includes a transport unit that transports the substrate in a transport direction, and first and second pressurizing units that pressurize the laminate material disposed on the front surface of the substrate. The second pressurizing unit is movable in the transport direction at a velocity higher than a transportation velocity of the substrate. When the laminate material is laminated on the substrate transported, the first pressurizing unit laminates the laminate material on the substrate from a central portion between an upstream end of the substrate in the transport direction and a downstream end of the substrate in the transport direction toward the upstream side of the transport direction, and the second pressurizing unit laminates the laminate material on the substrate from the central portion of the substrate toward the downstream side of the transport direction.

5 Claims, 6 Drawing Sheets

LAMINATION DEVICE

INCORPORATION BY REFERENCE

This application is based upon and claims the benefit of priority from Japanese patent application No. 2014-230404, filed on Nov. 13, 2014, the disclosure of which is incorporated herein in its entirety by reference.

BACKGROUND OF THE INVENTION

1. Field of the Invention

The present invention relates to a lamination device.

2. Description of Related Art

A build-up substrate having a configuration in which a plurality of printed wiring boards are laminated to mount electronic devices at a high density has been widely used. A technique of forming an insulating layer on a surface of a substrate by lamination is used to form the build-up substrate.

Japanese Unexamined Patent Application Publication No. H11-266080 discloses a technique in which in a lamination device that laminates a laminate material on a surface of a substrate, the laminate material disposed on the substrate transported is thermocompression bonded while the laminate material is pressed by heat pressure rollers from an end of the substrate.

SUMMARY OF THE INVENTION

As described in the "Description of Related Art" section, in the technique disclosed in Japanese Unexamined Patent Application Publication No. H11-266080, the laminate material disposed on the transported substrate is thermocompression bonded while the laminate material is being pressed by the heat pressure rollers from an end of the substrate. In other words, in the technique disclosed in Japanese Unexamined Patent Application Publication No. H11-266080, the laminate material is thermocompression bonded onto the substrate by sandwiching the substrate and the laminate material by the heat pressure rollers that are disposed above and below the substrate. At this time, the laminate material disposed on the surface of the substrate is laminated in a direction from an end of the substrate on the downstream side of a transport direction toward an end of the substrate on the upstream side of the transport direction. Accordingly, the heat pressure rollers cause a frictional force to be applied to the laminate material in one direction (a direction opposite to the transport direction). This leads to a problem that a positional deviation occurs between the substrate and the laminate material.

In view of the above-mentioned problem, an object of the present invention is to provide a lamination device capable of suppressing a positional deviation of a laminate material with respect to a substrate.

A first exemplary aspect of the present invention is a lamination device that laminates a laminate material on a front surface of a substrate, the laminating device including: a transport unit that transports the substrate in a transport direction; and first and second pressurizing units that pressurize the laminate material disposed on the front surface of the substrate. The second pressurizing unit is configured to be movable in the transport direction at a velocity higher than a transportation velocity of the substrate. When the laminate material is laminated on the substrate while the substrate is being transported by the transport unit, the first pressurizing unit laminates the laminate material on the substrate in a direction from a central portion of the substrate between an end of the substrate on an upstream side of the transport direction and an end of the substrate on a downstream side of the transport direction toward the upstream side of the transport direction, and the second pressurizing unit laminates the laminate material on the substrate in a direction from the central portion of the substrate toward the downstream side of the transport direction.

In the lamination device according to the first exemplary aspect of the present invention, the second pressurizing unit is configured to be movable in the transport direction at a velocity higher than the transportation velocity of the substrate. Accordingly, when the laminate material is laminated on the substrate while the substrate is being transported by the transport unit, the first pressurizing unit can laminate the laminate material on the substrate in the direction from the central portion of the substrate toward the upstream side of the transport direction, and the second pressurizing unit can laminate the laminate material on the substrate in the direction from the central portion of the substrate toward the downstream side of the transport direction. Therefore, the lamination can be started from the central portion of the substrate, and thus a distance from a lamination starting point (the central portion of the substrate) to a lamination end point (each end of the substrate) can be shortened. Consequently, a positional deviation of the laminate material with respect to the substrate can be suppressed.

According to exemplary aspects of the present invention, it is possible to provide a lamination device capable of suppressing a positional deviation of a laminate material with respect to a substrate.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

An embodiment of the present invention will be described below with reference to the drawings.

Figure 1:
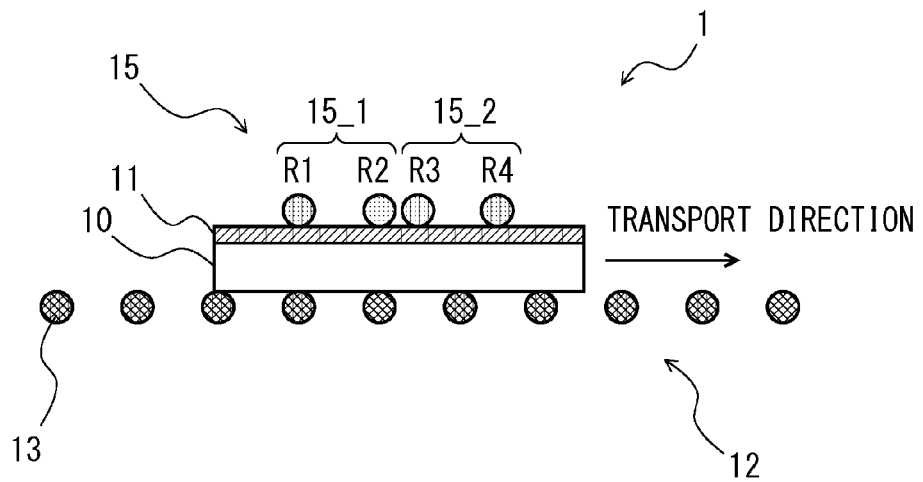
FIG. 1 is a side view showing a configuration example of a lamination device according to an embodiment.

FIG. 1 is a side view showing a lamination device according to this embodiment. As shown in FIG. 1, a lamination device 1 is a device that laminates a laminate material 11 on a front surface of a substrate 10. The lamination device 1 includes a transport unit 12 and a pressurizing unit 15. In this case, a glass epoxy substrate, for example, can be used as the substrate 10. A resin material or prepreg (for example, a material obtained by impregnating a resin into a glass fiber) can be used as the laminate material 11. Note that these materials are given by way of illustration only. In this embodiment, materials other than these materials can be used for the substrate 10 and the laminate material 11.

The transport unit 12 transports the substrate 10 in a transport direction. The transport unit 12 is provided on the back surface side of the substrate 10. For example, the transport unit 12 can be configured using a plurality of rollers 13. In this case, the rotation of the rollers 13 causes the substrate 10 to be transported in the transport direction. The laminate material 11 is disposed on the front surface of the substrate 10.

The lamination device 1 according to this embodiment further includes a heating unit that heats the substrate 10 from the back surface side of the substrate 10. For example, the heating unit can be configured by providing a heater in each roller 13 (transport unit). Specifically, since the rollers 13 come into contact with the back surface of the substrate 10 when the substrate 10 is transported, the substrate 10 can be heated from the back surface side of the substrate 10 by heating the rollers 13. Accordingly, heat can be applied from a bonded surface (a surface in contact with the substrate 10) side of the laminate material 11 disposed on the front surface of the substrate 10, which prevents excess heat from being applied to the laminate material 11 and prevents the laminate material 11 from being deformed.

The pressurizing unit 15 is configured to be displaced in the thickness direction (vertical direction) of the substrate 10 (see FIGS. 2B and 2C), and pressurizes the laminate material 11 disposed on the front surface of the substrate 10. In order words, the pressurizing unit 15 is used to pressurize the laminate material 11 in a state where heat is applied to the bonded surface of the laminate material 11, thereby making it possible to laminate the laminate material 11 on the substrate 10. For example, the pressurizing unit 15 can be configured using a first pressurizing unit 15_1 and a second pressurizing unit 15_2. The first pressurizing unit 15_1 is configured so that it does not move in the transport direction (i.e., it moves only in the vertical direction), and can be configured using, for example, rollers R1 and R2. The second pressurizing unit 15_2 is configured to be movable in the transport direction at a velocity higher than a transportation velocity of the substrate 10, and can be configured using, for example, rollers R3 and R4.

Figure 2A:
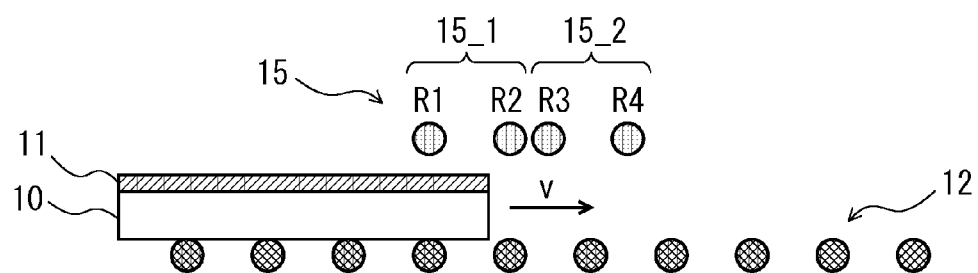
FIG. 2A is a side view for explaining an operation of the lamination device according to the embodiment.

Next, operations of the lamination device 1 according to this embodiment will be described with reference to FIGS. 2A to 2G and FIGS. 3A to 3C. Referring first to FIG. 2A, the laminate material 11 is disposed on the front surface of the substrate 10, and the substrate 10 on which the laminate material 11 is disposed is loaded into the lamination device 1. The loaded substrate 10 is transported at a transportation velocity v by the transport unit 12. At this time, heat is transferred to the substrate 10 from the rollers 13, so that the resin on the lower surface of the laminate material 11 is softened.

Figure 2B:
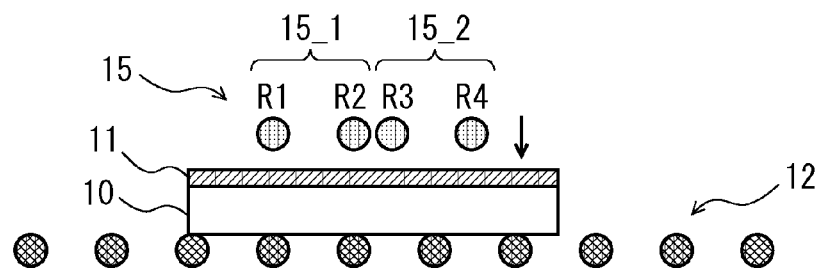
FIG. 2B is a side view for explaining an operation of the lamination device according to the embodiment.
Figure 2C:
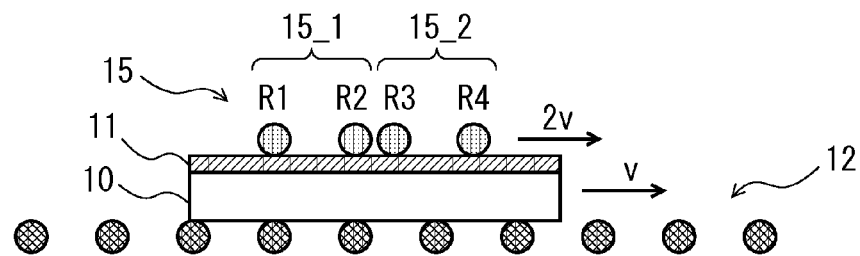
FIG. 2C is a side view for explaining an operation of the lamination device according to the embodiment.
Figure 2D:
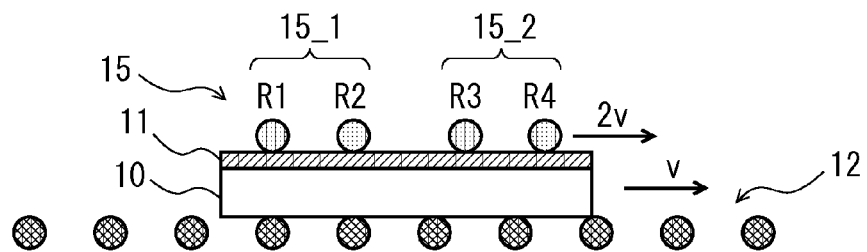
FIG. 2D is a side view for explaining an operation of the lamination device according to the embodiment.

After that, as shown in FIG. 2B, when the substrate 10 reaches a predetermined position, the first pressurizing unit 15_1 and the second pressurizing unit 15_2 descend and start to pressurize the laminate material 11. The term "predetermined position" used herein refers to a position where the rollers R2 and R3 are located in the vicinity of a central portion of the substrate 10. After that, as shown in FIG. 2C (also see the top view of FIG. 3A) and FIG. 2D (also see the top view of FIG. 3B), the second pressurizing unit 15_2 (rollers R3 and R4) moves in the transport direction at a velocity 2v, which is twice the transportation velocity v, while the transport unit 12 transports the substrate 10 at the transportation velocity v. As a result, the laminate material 11 is laminated on the substrate 10 by the first pressurizing unit 15_1 and the second pressurizing unit 15_2.

At this time, the first pressurizing unit 15_1 is configured so that it does not move in the transport direction. In other words, the first pressurizing unit 15_1 is configured in such a manner that a position of the first pressurizing unit 15_1 in the transport direction relative to the transport unit 12 is not changed. In this case, as the substrate 10 moves in the transport direction, the position of the first pressurizing unit 15_1 relative to the substrate 10 changes. Thus, the first pressurizing unit 15_1 laminates the laminate material 11 in a direction from a central portion (i.e., a central portion between an end of the substrate 10 on the upstream side of the transport direction and an end of the substrate 10 on the downstream side of the transport direction) of the substrate 10 toward the upstream side of the transport direction. A velocity at which the first pressurizing unit 15_1 laminates the laminate material 11 on the substrate 10 is the same as the transportation velocity v of the substrate 10.

The second pressurizing unit 15_2 moves in the transport direction at the velocity 2v which is twice the transportation velocity v. In this case, since the second pressurizing unit 15_2 moves faster than the substrate 10, a position of the second pressurizing unit 15_2 relative to the substrate 10 changes. Thus, the second pressurizing unit 15_2 laminates the laminate material 11 in a direction from the central portion of the substrate 10 toward the downstream side of the transport direction. A velocity at which the second pressurizing unit 15_2 laminates the laminate material 11 on the substrate 10 is the same as the relative velocity v of the second pressurizing unit 15_2 with respect to the substrate 10 (=(the transportation velocity (2v) of the second pressurizing unit 15_2)−(the transportation velocity (v) of the substrate)).

Accordingly, when the moving velocity of the second pressurizing unit 15_2 is twice the transportation velocity of the substrate 10, the velocity at which the first pressurizing unit 15_1 laminates the laminate material 11 on the substrate 10 is the same as the velocity at which the second pressurizing unit 15_2 laminates the laminate material 11 on the substrate 10.

Figure 2E:
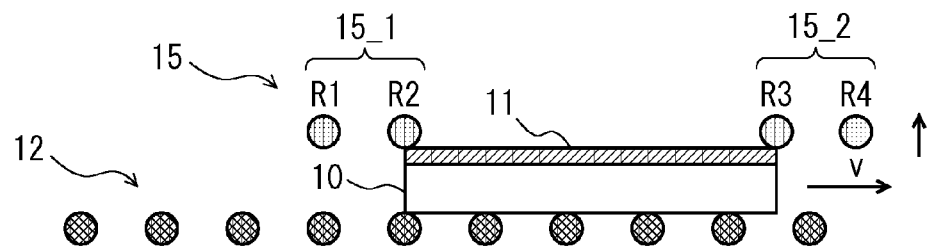
FIG. 2E is a side view for explaining an operation of the lamination device according to the embodiment.

As shown in FIG. 2E (also see the top view of FIG. 3C), when the roller R2 of the first pressurizing unit 15_1 reaches the upstream-side end of the substrate 10 and the roller R3 of the second pressurizing unit 15_2 reaches the downstream-side end of the substrate 10, the first pressurizing unit 15_1 and the second pressurizing unit 15_2 ascend and the pressurizing unit 15 stops pressurizing the laminate material 11.

Figure 2F:
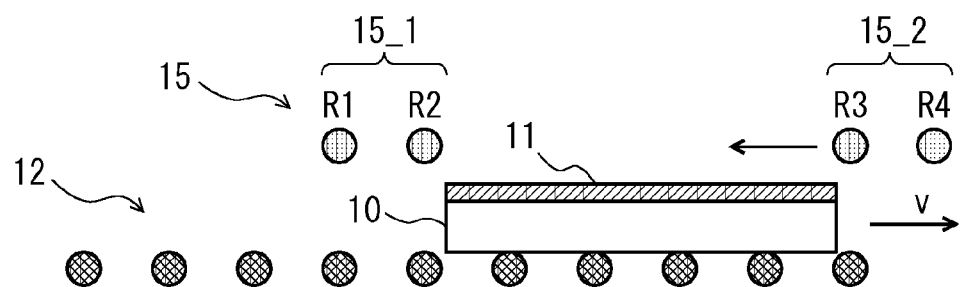
FIG. 2F is a side view for explaining an operation of the lamination device according to the embodiment.
Figure 2G:
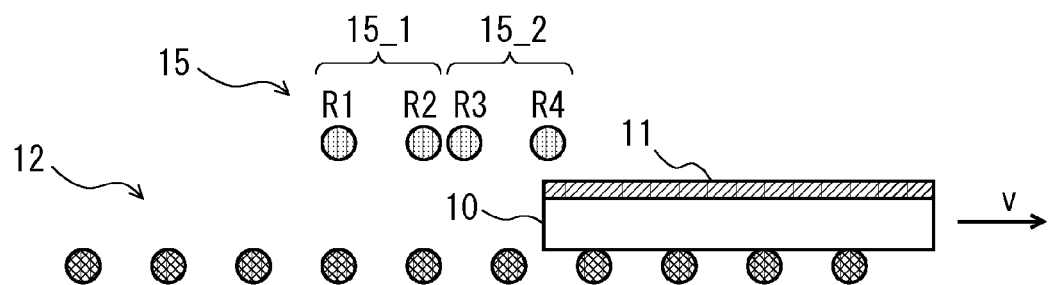
FIG. 2G is a side view for explaining an operation of the lamination device according to the embodiment.
Figure 3A:
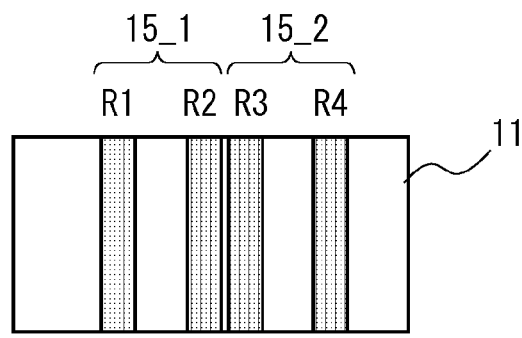
FIG. 3A is a top view for explaining an operation of the lamination device according to the embodiment.
Figure 3B:
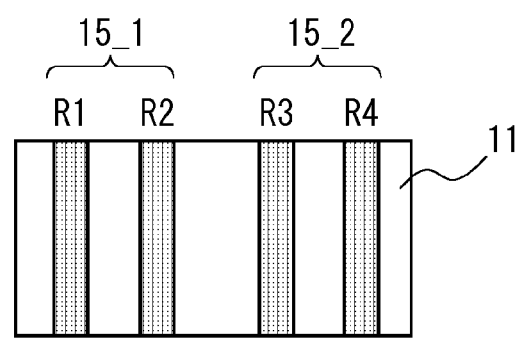
FIG. 3B is a top view for explaining an operation of the lamination device according to the embodiment.
Figure 3C:
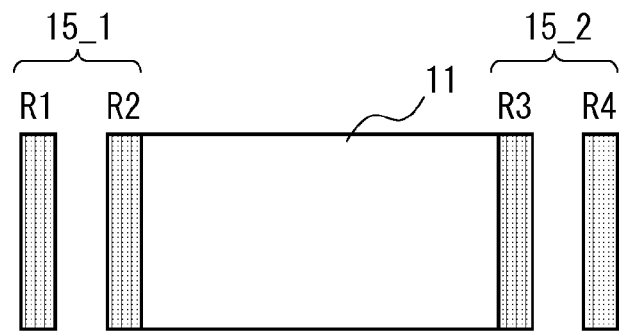
FIG. 3C is a top view for explaining an operation of the lamination device according to the embodiment.

After that, as shown in FIG. 2F, the second pressurizing unit 15_2 moves in a direction opposite to the transport direction. When the second pressurizing unit 15_2 reaches an initial position shown in FIG. 2G, the second pressurizing unit 15_2 stops and attains an initial state. After that, when a new substrate 10 is loaded, the lamination device 1 repeats the operations shown in FIGS. 2A to 2G.

As described in the "Description of Related Art" section, in the technique disclosed in Japanese Unexamined Patent Application Publication No. H11-266080, the laminate material disposed on the transported substrate is thermocompression bonded while the laminate material is pressed by the heat pressure rollers from an end of the substrate. In other words, in the technique disclosed in Japanese Unexamined Patent Application Publication No. H11-266080, the laminate material is thermocompression bonded onto the substrate by sandwiching the substrate and the laminate by the heat pressure rollers that are disposed above and below the substrate. At this time, the laminate material disposed on the front surface of the substrate is laminated in a direction from an end of the substrate on the downstream side of the transport direction toward an end of the substrate on the upstream side of the transport direction. Accordingly, the heat pressure rollers cause a frictional force to be applied to the laminate material in one direction (a direction opposite to the transport direction). This leads to a problem that a positional deviation occurs between the substrate and the laminate material.

Specifically, in the case of laminating a laminate material on a substrate, when the laminate material is laminated in one direction from one end of the substrate toward the other end thereof, a distance from a lamination starting point (one end) to a lamination end point (the other end) is increased, which results in an increase in positional deviation of the laminate material with respect to the substrate. For example, a positional deviation of the laminate material with respect to the substrate is proportional to the distance between the lamination starting point and the lamination end point.

On the other hand, in the lamination device according to this embodiment, the second pressurizing unit 15_2 is configured to be movable in the transport direction at a velocity higher than the transportation velocity of the substrate 10. Accordingly, when the laminate material 11 is laminated on the substrate 10 while the substrate 10 is transported by the transport unit 12, the first pressurizing unit 15_1 laminates the laminate material 11 on the substrate 10 in a direction from the central portion of the substrate 10 toward the upstream side of the transport direction, and the second pressurizing unit 15_2 laminates the laminate material 11 on the substrate 10 in a direction from the central portion of the substrate 10 toward the downstream side of the transport direction. Therefore, the lamination can be started from the central portion of the substrate 10, and thus the distance from the lamination starting point (the central portion of the substrate 10) to the termination end point (each end of the substrate) can be shortened. Consequently, a positional deviation of the laminate material 11 with respect to the substrate 10 can be suppressed.

In other words, a frictional force applied to the laminate material 11 can also be applied in the transport direction, that is, a frictional force applied to the laminate material 11 can be applied in the transport direction, as well as in the direction opposite to the transport direction, so that a deviation in the direction in which the frictional force is applied can be reduced. Thus, a positional deviation of the laminate material 11 with respect to the substrate 10 can be suppressed.

Further, in the lamination device 1 according to this embodiment, the substrate 10 is heated from the back surface side of the substrate 10 by heating each roller 13 (transport unit). Accordingly, heat can be applied from the bonded surface (the surface in contact with the substrate 10) side of the laminate material 11 disposed on the front surface of the substrate 10, which prevents excess heat from being applied to the laminate material 11 and prevents deformation of the laminate material 11 (for example, deformation of a hole in the laminate material 11). In other words, a temperature gradient can be provided to the front surface side of the substrate 10 from the back surface side of the substrate 10 by heating the substrate 10 by using the transport unit 12, instead of heating the substrate 10 by using the pressurizing unit 15. Thus, the laminate material 11 can be prevented from being deformed.

Other configuration examples of the lamination device according to this embodiment will be described.

Figure 4:
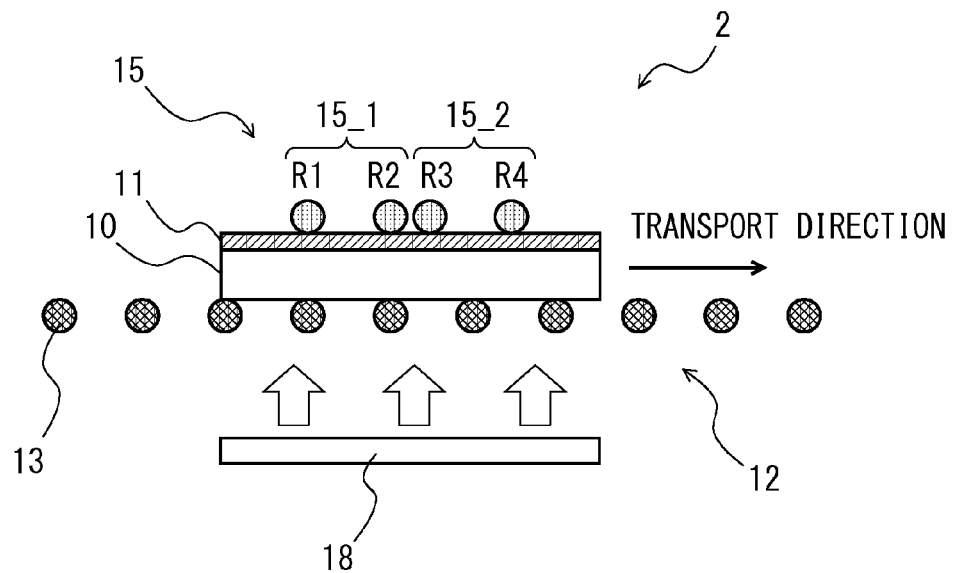
FIG. 4 is a side view showing another configuration example of the lamination device according to the embodiment.

In the lamination device 1 shown in FIG. 1, a heater (heating unit) is provided in each roller 13 (transport unit). However, in this embodiment, for example, a heating unit 18 may be provided on a lower side of the transport unit 12, as in a lamination device 2 shown in FIG. 4. The provision of the heating unit 18 on the lower side of the transport unit 12 makes it possible to uniformly heat the back surface side of the substrate 10.

Figure 5:
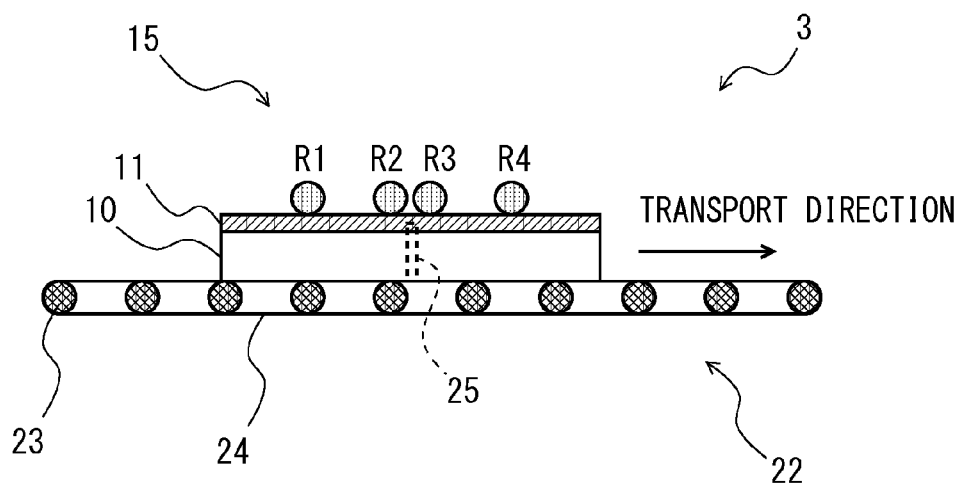
FIG. 5 is a side view showing a still further configuration example of the lamination device according to the embodiment.

Furthermore, in this embodiment, a transport unit 22 may be configured using a belt 24, as in a lamination device 3 shown in FIG. 5. Specifically, the transport unit 22 may be configured by winding the belt 24 around a plurality of rollers 23. In this case, the belt 24 can be uniformly heated and a contact area between the substrate 10 and the belt 24 can be increased. Accordingly, the substrate 10 can be uniformly heated from the back surface side of the substrate 10. Moreover, the substrate 10 can be stably transported.

Figure 6:
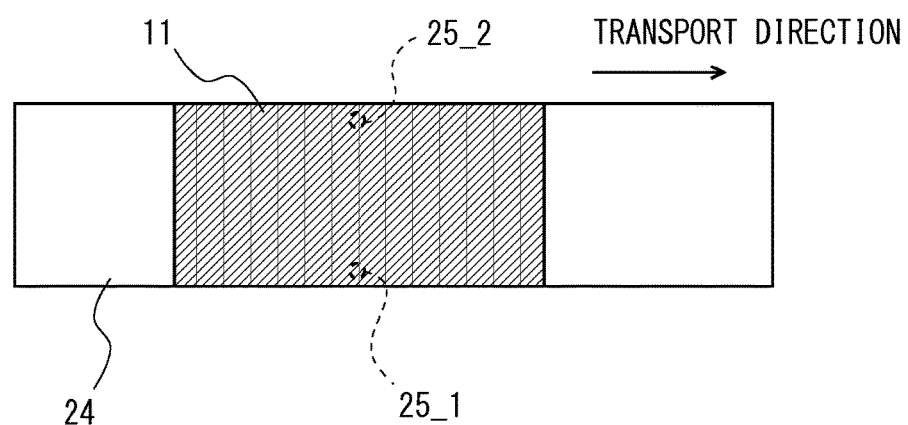
FIG. 6 is a top view showing still one more configuration example of the lamination device according to the embodiment.

When the transport unit 22 is configured using the belt 24, a locating pin 25 may be provided in the belt 24 as shown in FIGS. 5 and 6. The locating pin 25 penetrates through the substrate 10 in the thickness direction of the substrate 10 and is configured to fit a recess formed in the laminate material 11. Specifically, a relative position between the substrate 10 and the laminate material 11 is fixed using the locating pin 25, thereby reliably suppressing a positional deviation between the substrate 10 and the laminate material 11. At this time, the locating pin 25 is configured so that it does not penetrate through the laminate material 11. Accordingly, the pressurizing unit 15 passes over the locating pin 25. For example, as shown in FIG. 6, the locating pins 25 can be provided on both sides of the belt as indicated by 25_1 and 25_2 in a direction intersecting the transport direction of the belt 24.

The locating pins may be provided at positions corresponding to four corners of the substrate 10. In this case, the number of the locating pins is four. The locating pins may also be provided at positions corresponding to two opposing corners of the substrate 10. In this case, the number of the locating pins is two. The positions where the locating pins are provided are not limited to the above-mentioned positions. The locating pins may be provided at any positions other than these positions.

Figure 7:
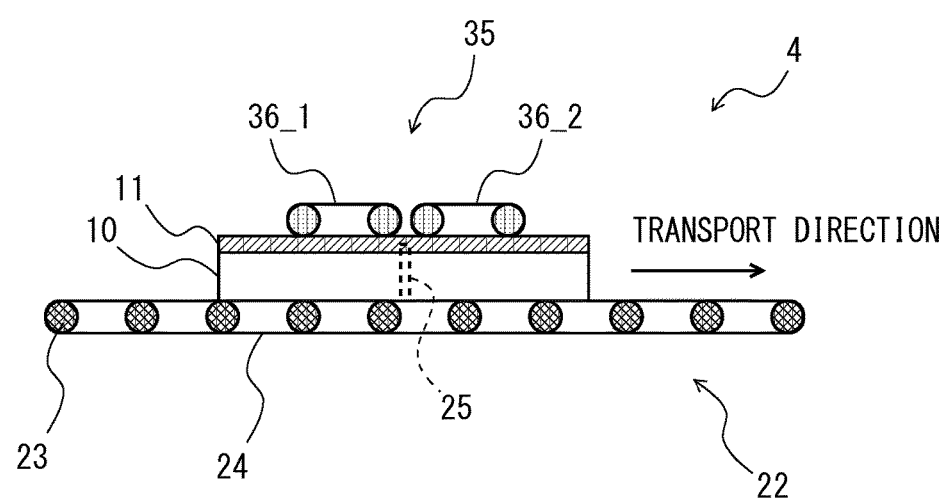
FIG. 7 is a side view showing yet one configuration example of the lamination device according to the embodiment.

In this embodiment, a pressurizing unit 35 may be configured using belts 36_1 and 36_2, as in a lamination device 4 shown in FIG. 7. Specifically, the pressurizing unit 35 may be configured by winding the belt 36_1 around a plurality of rollers and by winding the belt 36_2 around a plurality of rollers. In this case, the first pressurizing unit corresponds to the belt 36_1 and the second pressurizing unit corresponds to the belt 36_2. In this manner, the pressurizing unit 35 is configured using the belts 36_1 and 36_2, thereby making it possible to increase the contact area between the laminate material 11 and the pressurizing unit 35 and thus stably laminate the laminate material 11.

In this embodiment, for example, the pressurizing unit 35 may be configured using the belts 36_1 and 36_2 as shown in FIG. 7, and the transport unit 12 may be configured using the rollers 13 as shown in FIG. 1.

The number of the rollers each used as the transport unit and the number of the rollers each used as the pressurizing unit are given by way of illustration only. In the lamination devices according to this embodiment, the number of the rollers can be arbitrarily determined.

The above embodiment illustrates an example in which the second pressurizing unit 15_2 (rollers R3 and R4) moves in the transport direction at the velocity 2v that is twice the transportation velocity v of the substrate 10. However, the velocity of the second pressurizing unit 15_2 is not limited to this. That is, the velocity of the second pressurizing unit 15_2 is not particularly limited as long as the velocity is higher than the transportation velocity v of the substrate 10.

Further, the above embodiment illustrates an example in which the first pressurizing unit 15_1 (rollers R1 and R2) is configured so that it does not move in the transport direction. However, in this embodiment, the first pressurizing unit 15_1 may be configured to move in the transport direction. In this case, the velocity of the first pressurizing unit 15_1 is set to be lower than the transportation velocity v of the substrate 10. The first pressurizing unit 15_1 may also be configured to move in the direction opposite to the transport direction of the substrate 10. As described above, when the first pressurizing unit 15_1 is configured so that it does not move in the transport direction, there is no need to provide a moving unit to move the first pressurizing unit 15_1 in the transport direction. Thus, the configuration of the device can be simplified.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A lamination device that laminates a laminate material on a front surface of a substrate, the laminating device comprising:
   a transport unit that is provided on a back surface side of the substrate and that transports the substrate in a transport direction; and
   first and second pressurizing units that are provided on a front surface side of the substrate and that pressurize the laminate material disposed on the front surface of the substrate, wherein
   the first pressurizing unit is configured so that the first pressurizing unit does not move in the transport direction,
   the second pressurizing unit is configured to be movable in the transport direction at a velocity that is twice a transportation velocity of the substrate, and
   when the laminate material is laminated on the substrate while the substrate is being transported by the transport unit, the first pressurizing unit laminates the laminate material on the substrate in a direction from a central portion of the substrate between an end of the substrate on an upstream side of the transport direction and an end of the substrate on a downstream side of the transport direction toward the upstream side of the transport direction, and the second pressurizing unit laminates the laminate material on the substrate in a direction from the central portion of the substrate toward the downstream side of the transport direction.

2. The lamination device according to claim 1, further comprising a heating unit that heats the substrate from the back surface side of the substrate.

3. The lamination device according to claim 2, wherein the heating unit is a heater provided in the transport unit.

4. The lamination device according to claim 1, wherein the pressurizing unit is configured using one of a roller and a belt, and
   the transport unit is configured using one of a roller and a belt.

5. The lamination device according to claim 1, wherein the transport unit is configured using a belt, and
   the belt includes a locating pin that penetrates through the substrate in a thickness direction of the substrate and is configured to fit a recess formed in the laminate material.

\* \* \* \* \*